(12) United States Patent
Griffith et al.

(10) Patent No.: US 7,316,031 B2
(45) Date of Patent: Jan. 1, 2008

(54) SYSTEM AND METHOD FOR REMOTELY MONITORING WIRELESS NETWORKS

(75) Inventors: Terry A. Griffith, Glen Allen, VA (US); Stephen M. Moran, Glen Allen, VA (US); John M. Bragg, Midlothian, VA (US)

(73) Assignee: Capital One Financial Corporation, McLean, VA (US)

( * ) Notice: Subject to any disclaimer, the term of this patent is extended or adjusted under 35 U.S.C. 154(b) by 728 days.

(21) Appl. No.: 10/236,633

(22) Filed: Sep. 6, 2002

(65) Prior Publication Data

US 2004/0049699 A1 Mar. 11, 2004

(51) Int. Cl.
*G06F 21/00* (2006.01)
*G06F 21/20* (2006.01)

(52) U.S. Cl. .......................... 726/22; 726/23; 726/25; 726/26; 713/182; 713/188; 709/223; 709/224; 709/229

(58) Field of Classification Search ...................... None
See application file for complete search history.

(56) References Cited

U.S. PATENT DOCUMENTS

| | | | | | |
|---|---|---|---|---|---|
| 5,991,881 | A | * | 11/1999 | Conklin et al. ................ | 726/22 |
| 6,134,664 | A | * | 10/2000 | Walker ......................... | 726/22 |
| 6,408,391 | B1 | * | 6/2002 | Huff et al. .................... | 726/22 |
| 6,954,790 | B2 | * | 10/2005 | Forslow ....................... | 709/227 |
| 2002/0036991 | A1 | | 3/2002 | Inoue .......................... | 370/328 |
| 2002/0087882 | A1 | | 7/2002 | Schneier et al. ............. | 713/201 |
| 2002/0094777 | A1 | | 7/2002 | Cannon et al. ............... | 455/41 |
| 2002/0188864 | A1 | * | 12/2002 | Jackson ....................... | 713/201 |
| 2003/0046581 | A1 | * | 3/2003 | Call et al. .................... | 713/201 |
| 2003/0217289 | A1 | * | 11/2003 | Ammon et al. ............. | 713/201 |
| 2003/0236990 | A1 | * | 12/2003 | Hrastar et al. .............. | 713/200 |
| 2003/0236995 | A1 | * | 12/2003 | Fretwell, Jr. ................ | 713/200 |
| 2004/0003285 | A1 | * | 1/2004 | Whelan et al. ............. | 713/201 |
| 2004/0157624 | A1 | * | 8/2004 | Hrastar ....................... | 455/456.1 |

FOREIGN PATENT DOCUMENTS

WO WO 96/38994 12/1996

OTHER PUBLICATIONS

F. Gong "Next Generation Intrustion Detection Systems (IDS)" (Mar. 2002) Intruvert Networks Whitepaper.*

(Continued)

*Primary Examiner*—Syed A. Zia
(74) *Attorney, Agent, or Firm*—Hunton & Williams, LLP

(57) ABSTRACT

A system for monitoring a wireless network is provided. The system includes a security network including a plurality of monitoring devices coupled to a centralized security manager. The security network is operable to manage access to a data network associated with a plurality of authorized devices. Each monitoring device is operable to receive packets communicated from one or more wireless device and communicate one or more of the packets to the centralized security manager. Each packet is associated with a communication session. The centralized security manager is operable to receive and analyze the one or more packets communicated from each monitoring device. The centralized security manager is further operable to determine whether a particular communication session is valid based on the analysis of at least one particular packet associated with a particular wireless device, and to communicate an alert if the particular communication session is not valid.

45 Claims, 6 Drawing Sheets

OTHER PUBLICATIONS

Balasubramaniyan, J.S., Garcia-Fernandez, J.O., Isacoff, D., Spafford, E., Zamboni, D. "An architecture for intrusion detection using autonomous agents" (Dec. 1998) Computer Security Applications Conference,Proceedings. 1998, 14th Annual.*

PDAStreet.com, Lisa Phifer, *Wireless Privacy: An Oxymoron?*, pp. 1-2, http://www.80211-planet.com/columns/article/0,4000,1781_786641,00.html, Apr. 26, 2001.

802.11 Wireless LAN Security, Lisa Phifer, *Wireless Privacy: An Oxymoron?*, pp. 1-3, http://www.80211-planet.com/columns/article/0,,1781_786641_2,00.html, Apr. 26, 2001.

SearchSecurity.com, *War Driving*, pp. 1-2, http://searchsecurity.techtarget.com/sDefinition/0,,sid14_gci812927,00.html, Apr. 1, 2002.

SearchNetworking.com, Kurt Ringleben, *The Secret to Secure Wireless LANs*, pp. 1-3, http://searchnetworking.techtarget.com/qna/0,289202,sid7_gci831265,00.html, Jun. 6, 2002.

Webopedia, *Wired Equivalent Privacy*, pp. 1-2, http://www.webopedia.com/TERM/W/WEP.html, Aug. 5, 2002.

Notification of Transmittal of the International Search Report or the Declaration (PCT Rule 44.1) mailed Jul. 15, 2004 (7 pages) re International Application No. PCT/US 03/27644, filed Sep. 4, 2003.

Bahl et al., Pawns: Satisfying the Need for Ubiquitous Secure Connectivity and Location Services, IEEE Wireless Communications, IEEE Service Center, Piscatawy, New Jersey, vol. 9, No. 1, Feb. 2002, pp. 40-48, XP001077102, ISSN: 1070-9916.

* cited by examiner

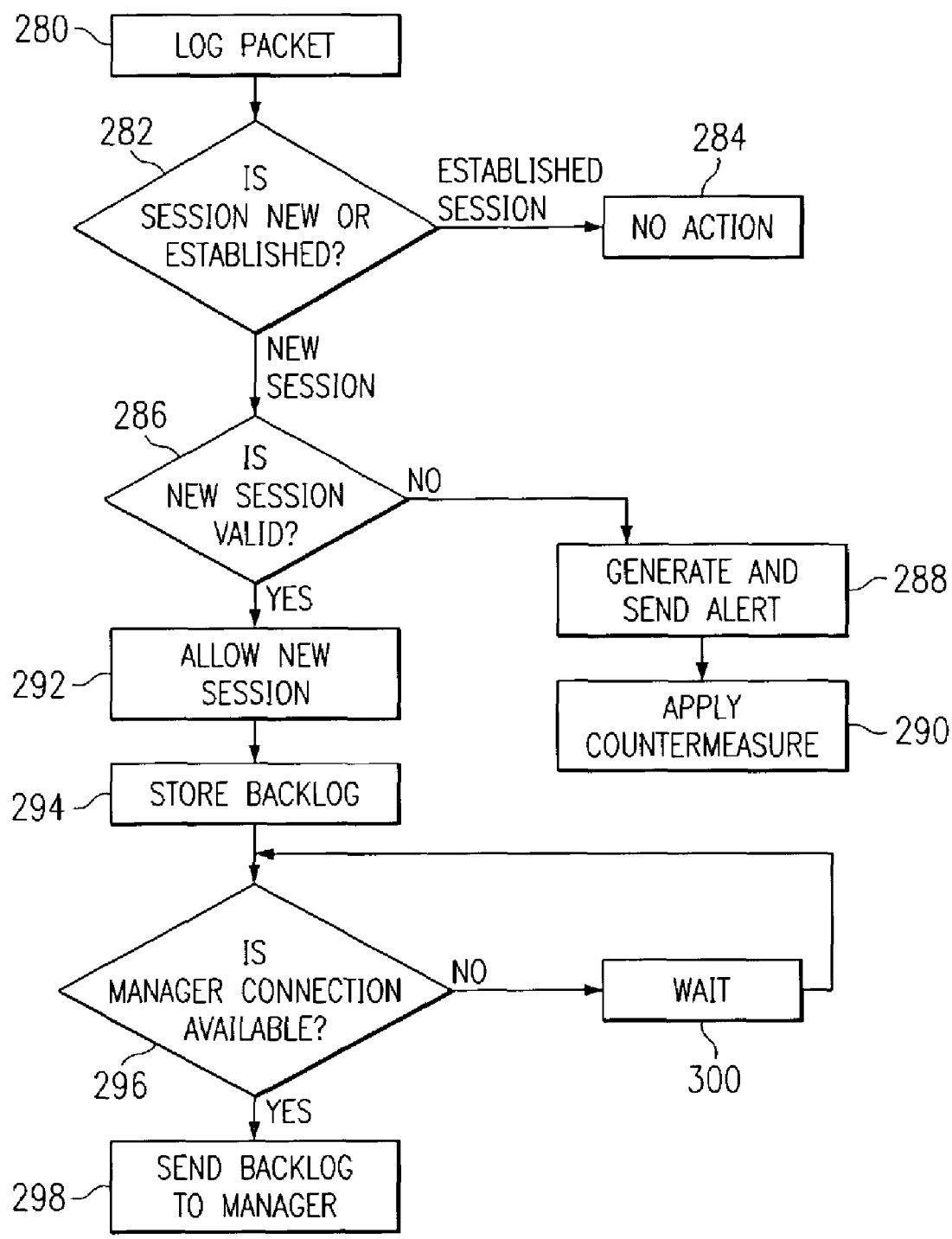

SYSTEM AND METHOD FOR REMOTELY MONITORING WIRELESS NETWORKS

TECHNICAL FIELD OF THE INVENTION

This invention relates in general to wireless networks and, more particularly, to a system and method for remotely monitoring wireless networks.

BACKGROUND OF THE INVENTION

Conventional local area networks (LANs) use wires or optical fibers as the common carrier medium. However, due to improved data rates and decreasing equipment prices, businesses are rapidly adopting wireless LANs as a cost effective networking solution. Using wireless LAN technology, businesses can easily solve end user, or client, requests and provide immediate connectivity without having to install wiring as employees move within buildings or from building to building. Thus, employees may be connected to the network whether they are at or away from their desks. In addition, additions and changes to a wireless LAN are relatively easy to implement.

However, although wireless LANs may be easier to deploy and less expensive than traditional wired networks, they are inherently less secure than wired networks since wired networks may be at least partially located inside a building that can be protected from unauthorized access. Wireless LANs, which involve communication over radio waves, do not have the same physical protection and therefore are more vulnerable to attacks. In essence, everything that is transmitted or received over a wireless network can be intercepted. A major security issue with wireless LANs is that data being communicated may radiate beyond the area physically controlled by the business. For example, 802.11b radio waves at 2.4 GHz easily penetrate building walls and may be received up to several blocks away. An attacker located some distance from the building may passively capture, or sniff, traffic being communicated over the wireless LAN. In particular, an attacker may capture user name and password information regarding an authorized user. The attacker can then use this captured information to masquerade as the authorized user in order to gain access to the wireless LAN. In addition, if the attacker can sniff the wireless traffic, he may also be able to inject false traffic into the network. Thus, the attacker may be able to issue commands on behalf of the authorized user by injecting traffic into the network and hijacking the authorized user's session. Using this technique, the attacker may trick the network into passing sensitive data from the backbone of the network to the attacker's wireless station. The attacker may thus gain access to sensitive data that normally would not be sent over the wireless LAN.

Another security risk of using wireless LANs involves unauthorized devices being placed on the wireless LAN. For example, an internal employee wanting to add his own wireless capabilities to a wired network may plug his own base station or access point into the wired network. This may create a security risk if the added access point has not been properly configured, as attackers may gain access to the network through the unauthorized access point. Alternatively, an attacker may physically place a base station or access point on the network providing the attacker remote access to the network using wireless communications.

SUMMARY OF THE INVENTION

In accordance with the present invention, systems and methods for remotely monitoring wireless networks are provided. Generally, a security system for wireless communications includes a plurality of wireless monitors connected to a centralized security manager. Each wireless monitor collects or "sniffs" wireless signals associated with a wireless network, such as a wireless LANs. The wireless monitors then communicate interesting signals regarding new communication sessions to the centralized security manager. The centralized security manager analyzes the interesting signals to determine whether new communication sessions are authorized. If the centralized security manager determines that a particular new communication session is not authorized, the centralized security manager may generate and communicate an alert to appropriate security personnel. The security personnel, or the centralized security manager itself, may initiate one or more countermeasures in real time to prevent the unauthorized communication session from being established, to prevent future attacks, and/or to catch the attacker.

According to one embodiment, a system for monitoring a wireless network is provided. The system includes a security network including a plurality of monitoring devices coupled to a centralized security manager. The security network is operable to manage access to a data network associated with a plurality of authorized devices. Each monitoring device is operable to receive packets communicated from one or more wireless device and communicate one or more of the packets to the centralized security manager. Each packet is associated with a communication session. The centralized security manager is operable to receive and analyze the one or more packets communicated from each monitoring device. The centralized security manager is further operable to determine whether a particular communication session is valid based on the analysis of at least one particular packet associated with a particular wireless device, and to communicate an alert if the particular communication session is not valid.

According to another embodiment, another system for monitoring a wireless network is provided. The system includes a security network including a plurality of monitoring devices coupled to a centralized security manager. The security network is operable to manage access to a data network associated with a plurality of authorized devices. Each monitoring device is operable to receive packets communicated from one or more wireless device and select one or more of the received packets to be analyzed. Each packet is associated with a communication session. Each monitoring device is further operable to determine whether the selected packets are to be analyzed locally or by the centralized security manager. Each monitoring device is further operable to communicate the selected packets to the centralized security manager if it is determined that the selected packets are to be analyzed by the centralized security manager. Each monitoring device is further operable to analyze the selected packets if it is determined that the selected packets are to be analyzed locally, and to determine whether the communication session is valid based on the analysis of the selected packets. The centralized security manager is operable to receive the selected packets from the monitoring device if it is determined that the selected packets are to be analyzed by the centralized security manager, analyze the received selected packets, and determine whether the communication session is valid based on the analysis of the received selected packets.

According to yet another embodiment, a method of validating a communications session in a wireless network is provided. The method includes receiving one or more packets communicated from a wireless device at a monitoring devices operable to monitor at least a portion of a network including a plurality of authorized devices. The one or more packets are associated with a communication session. The method further includes determining whether the communication session is valid, which includes determining the manufacturer of the wireless device based on the one or more packets, determining whether the manufacturer of the wireless device matches the manufacturer of at least one of the plurality of authorized wireless clients, determining whether the wired equivalency privacy (WEP) associated with the wireless device is turned on, and determining whether the MAC address of the wireless device matches the MAC address of any of the plurality of authorized wireless devices.

Various embodiments of the present invention may benefit from numerous advantages. It should be noted that one or more embodiments may benefit from some, none, or all of the advantages discussed below.

One advantage of the invention is that a system that combines remote monitoring of wireless networks with centralized security management. The system includes a plurality of wireless monitors coupled to a centralized security manager operable to detect both unauthorized clients and rogue access points, including unauthorized clients outside of the physical structure in which the access points are located. Thus, if the access points are located within a building, the wireless monitors may detect attackers attempting to access the wireless network from outside of the building, such as by war driving, for example.

Another advantage is that the system may react in real time to prevent an unauthorized communication session from being established, to prevent future attacks, and/or catch attackers. For example, the centralized security manager may analyze interesting packets communicated during an attempted establishment of a communication session, determine whether the communication session is authorized, and react in time to prevent the unauthorized communication session from being established. This provides an advantage over security systems based on an analysis of unauthorized communication sessions performed after the sessions have been established or even completed.

Yet another advantage is that an effective method of determining unauthorized communication sessions is provided. For determining whether a communication session originated by a wireless client is authorized, this may include determining whether the manufacturer of wireless client matches the manufacturer of at least one authorized client, determining whether the Wired Equivalency Privacy (WEP) associated with the wireless client is turned on, and determining whether the MAC address of the wireless client matches the MAC address of one of the authorized clients. For determining whether a communication session originated by a wireless access point is authorized, this may include determining whether the manufacturer of wireless access point matches the manufacturer of at least one authorized access point, determining whether the WEP associated with the wireless access point is turned on, determining whether the SSID of the wireless access point matches the SSID of the authorized access points, determining whether the BSS MAC address of the wireless access point matches the BSS MAC address of one of the authorized access points, and determining whether the wireless access point is broadcasting.

Still another advantage is that the local wireless monitors may also be operable to analyze packets to detect unauthorized communication sessions, such as in a situation in which a connection to the centralized security manager is not currently available. The centralized security manager as well as each wireless monitor may have a database of authorized communication sessions, access points, and wireless clients. The centralized security manager may communicate with each wireless monitor to keep their respective database updated or synchronized.

Other technical advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 8 illustrates a method of analyzing the interesting packet locally at a wireless monitor to determine whether the communication session of FIG. 6 is authorized.

DETAILED DESCRIPTION OF THE DRAWINGS

Example embodiments of the present invention and their advantages are best understood by referring now to FIGS. 1 through 8 of the drawings, in which like numerals refer to like parts. Generally, a security system for wireless communications includes a plurality of wireless monitors operable to remotely monitor wireless signals being communicated in or around one or more wireless networks, such as one or more wireless LANs. Each wireless monitor collects or "sniffs" wireless signals and communicates interesting signals regarding new communication sessions to a centralized security manager for analysis. The centralized security manager may analyze the interesting signal to determine whether or not the new communication session is authorized. If the centralized security manager determines that the new communication session is not authorized, the centralized security manager generates an alert which may be communicated to security personnel and/or to one or more of the wireless devices associated with the unauthorized communication session. In particular embodiments, the security personnel or the centralized security manager may also initiate one or more countermeasures in real time to prevent the unauthorized communication session from being established, prevent future attacks, and/or catch the attacker.

Figure 1:
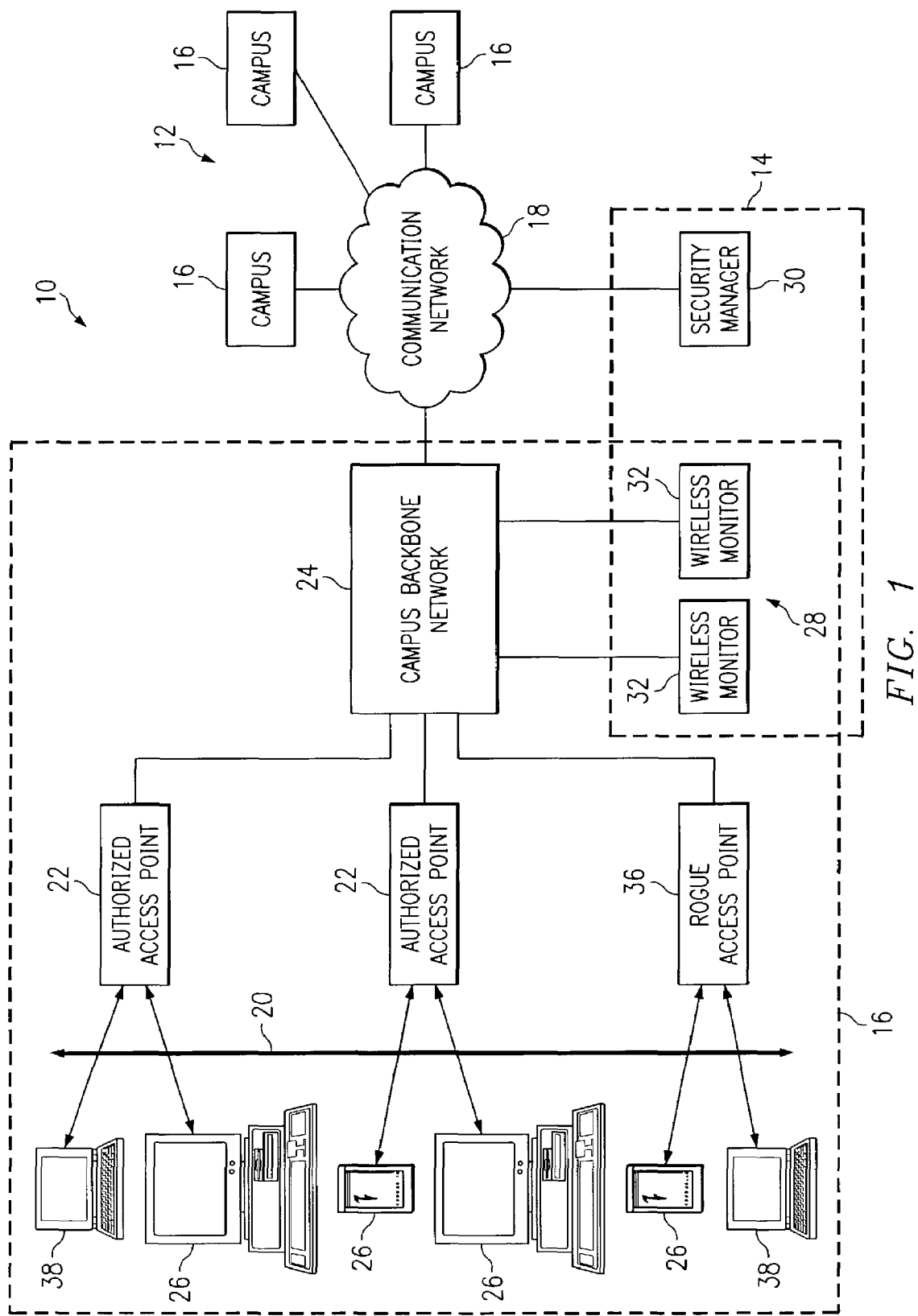
FIG. 1 illustrates a system for remotely monitoring wireless networks in accordance with an embodiment of the present invention.

FIG. 1 illustrates a system 10 for remotely monitoring wireless networks in accordance with an embodiment of the present invention. System 10 includes a data network 12 and a security network 14 operable to provide security to data network 12. Data network 12 may be any network in which data may be communicated and may in particular embodiments include a plurality of campuses 16 connected to a communications network 18. Each campus 16 may include one or more local area networks (LANs), metropolitan area networks (MANs), wide area networks (WANs), portions of the internet, or any other appropriate wireline, optical, wireless, or other links.

In the embodiment shown in FIG. 1, one particular campus 16 includes a wireless LAN 20 having a two-level hierarchical topology. In this embodiment, wireless LAN 20 includes a plurality of authorized wireless base stations, or access points, 22 connected to a campus backbone network 24. Authorized access points 22 may include any device capable of receiving and/or transmitting wireless communications. Each authorized wireless access point 22 provides a number of authorized mobile stations, or clients, 26 a point of access to data network 12. Thus, authorized clients 26 may communicate with authorized access points 22 using wireless communications to gain access to data network 12. Authorized clients 26 may include personal computers (PCs), laptops, handheld devices such as personal digital assistants (PDAs), or any other device capable of transmitting and/or receiving wireless communications.

The number of authorized clients 26 connected to data network 12 through each authorized access point 22 may vary over time as authorized clients 26 initiate, establish, and terminate communication sessions with data network 12. In some embodiments, each authorized client 26 may gain access to data network 12 through any authorized access point associated with wireless LAN 20.

Campus backbone network 24 may include any network suitable to communicate with authorized access points 22. In some embodiments, campus backbone network 24 comprises a wired local area network (LAN) based on any of a variety of protocols, such as Ethernet, token ring, or fiber distributed data interface (FDDI) protocols, and including any of a variety of topologies, such as bus, ring, star, or tree topologies, for example. As discussed above, campus backbone network 24 may be connected to communications network 18 such that the particular campus 16 may communicate with the other campuses 16. Communications network 18 may include one or more local area networks (LANs), metropolitan area networks (MANs), wide area networks (WANs), portions of the internet, or any other appropriate wireline, optical, wireless, or other links.

In some embodiments, campus 16 may be an industrial campus including one or more office buildings. Each building may include one or more wireless LANs, each including a number of geographically dispersed authorized access points 22 connected to a campus backbone network 24. Each authorized access point 22 may provide wireless coverage for a particular area or cell such that authorized clients 26 located within the particular area or cell may communicate with the respective authorized access point 22.

Security issues arise when unauthorized access points or clients join or attempt to join wireless LAN 20. For example, as shown in FIG. 1, an unauthorized, or rogue, access point 36 may be connected to campus backbone network 24 and thus to data network 12. A rogue access point 36 may be connected to campus backbone network 24 by an internal employee desiring mobile access to data network 12 or by an outside attacker desiring access to data network 12. Rogue access points 36 may also include access points that were authorized to be connected to campus backbone network 24, but are misconfigured in some way. For example, an access point from the factory may be configured with one or more insecure default settings, such as the wireless equivalent privacy (WEP) being turned off. If such an access point is then connected to campus backbone network 24 without being properly reconfigured, the access point may be a rogue access point 36.

Rogue access points 36 may present a number of security issues. For example, if the rogue access point 36 is not properly configured to meet the standards of data network 12 or security network 14 (for example, if access to the rogue access point 36 is not password protected or the wireless equivalent privacy (WEP) is turned off), it may be relatively easy for an attacker within the area of coverage of the rogue access point 36 to gain access to data network 12 through the rogue access point 36. If the area of coverage of a rogue access point 36 located within a building extends outside of the building, an attacker located outside the building but within the area of coverage may have easy access to data network 12 through the rogue access point 36. However, as discussed below in greater detail, security network 14 is operable to identify rogue access points 36 and act accordingly to reduce or eliminate their potential security risks.

In addition to unauthorized access points, unauthorized clients pose a threat to security. For example, as shown in FIG. 1, an attacker with an unauthorized client 38 (such as a laptop or PDA, for example) may attempt to access data network 12 through one or more authorized access points 22. For example, if the area of coverage of an authorized access point 22 located within a building extends outside of the building, an attacker located outside the building but within the area of coverage may attempt to access data network 12 through the authorized access point 22 using the unauthorized client 38. For example, an attacker may be able to detect, or "sniff," security information, such as password information or security key information, from wireless signals being communicated between the authorized access point 22 and authorized clients 26. The attacker may then be able to use the security information to masquerade as an authorized client 26 in order to access data network 12 through the authorized access point 22. The attacker may also be able to inject false traffic from the unauthorized client 38 into data network 12 via the authorized access point 22 in order to hijack an authorized communication session. In addition, the attacker may use an arpspoof technique to trick data network 12 into passing sensitive data to unauthorized client 38 that would not ordinarily be sent over a wireless link. However, as discussed below in greater detail, security network 14 is operable to identify unauthorized clients 38 and to act accordingly to reduce or eliminate their potential security risks.

Thus, security network 14 is generally operable to provide security to data network 12 by reducing or eliminating the security risks associated with rogue access points 36 and unauthorized clients 38. In some embodiments, security network 14 is operable to monitor wireless communications associated with wireless LANs 20 and to identify invalid or unauthorized communication sessions (in other words, communications sessions involving a rogue access point 36 and/or an unauthorized client 38), and to prevent such invalid or unauthorized communication sessions.

As shown in FIG. 1, security network 14 may include a campus security network 28 generally located at each of one or more campuses 16 and a centralized security manager 30 connected to each campus security network 28. Each campus security network 28 may include a plurality of wireless monitors, or monitoring devices, 32 connected to campus backbone network 24. However, it should be understood that security network 14 may be otherwise suitably configured or arranged such that a plurality of wireless monitors 32 are connected to a centralized security manager 30. For example, in an alternative embodiment, each campus 16 includes a plurality of wireless monitors 32 and a security manager 30 coupled to the campus backbone network 24 of that campus 16 and operable to manage the wireless monitors 32 located at that campus 16. Thus, the campus security network 28 associated with each campus 16 may have its own centralized security manager 30. In one embodiment, such centralized security managers 30 may communicate with each other to facilitate the operation of security network 14.

Wireless monitors 32 may be operable to collect wireless signals associated with wireless LAN 20, filter the signals to determine interesting signals, and communicate the interesting signals to centralized security manager 30. Centralized security manager 30 may be operable to receive the interesting signals, analyze the interesting signals to identify unauthorized communication sessions, and act accordingly in real time to prevent such unauthorized communication sessions.

Figure 2:
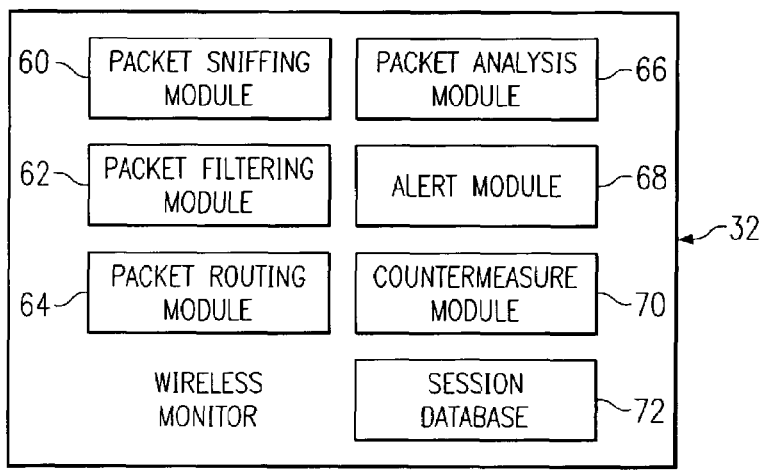
FIG. 2 illustrates an example wireless monitor in accordance with an embodiment of the present invention.

FIG. 2 illustrates an example wireless monitor 32 in accordance with an embodiment of the present invention. Wireless monitor 32 may include various modules operable to perform various functions, including a packet sniffing module 60, a packet filtering module 62, a packet routing module 64, a packet analysis module 66, an alert module 68, a countermeasure module 70, and a session database 72.

Packet sniffing module 60 may be operable to collect, or "sniff," wireless communications associated with wireless LAN 20. For example, packet sniffing module 60 may be operable to collect wireless signals, or packets, communicated from authorized and rogue access points 22 and 36 and authorized and unauthorized clients 26 and 38. Each packet may generally be associated with a particular communication session associated with wireless LAN 20. For example, the packet may have been communicated by an authorized or unauthorized client 26 or 38 and may concern a request by the client 26 or 38 to establish a communication session with a particular authorized or rogue access point 22 or 36. As another example, the packet have been broadcast from an authorized or rogue access point 22 or 36 and intended for one or more authorized or unauthorized clients 26 or 38. As another example, the packet may have been communicated from an authorized or rogue access point 22 or 36 in response to a communication received from an authorized or unauthorized client 26 or 38. The term "packet" is intended to include any group or bundle of data, such as a datagram, frame, message, segment, or cell, for example, which may be transmitted by any one or more types of communications media, such as wireline, optical, wireless, or any other type of communications links.

Packet filtering module 62 may be operable to filter packets collected by packet sniffing module 60 to determine relevant, or interesting, packets. Interesting packets may include packets concerning the authentication, authorization, and/or establishment of a communication session, such as packets communicated by authorized and rogue access points 22 and 36 and/or authorized and unauthorized clients 26 and 38 during key exchange handshaking, for example. In some embodiments, relevant or interesting packets selected by packet filtering module 62 generally do not include traffic data packets communicated after a communication session is established. In a particular embodiment, packet filtering module 62 may select as relevant or interesting based on whether particular types of encryption are turned on or off on the wireless device from which particular packets were received.

Packet routing module 64 may be operable to determine whether particular selected as relevant or interesting by packet filtering module 62 are to be analyzed locally by the packet analysis module 66 of the wireless monitor 32 or communicated to and analyzed by centralized security manager 30. In particular embodiments, this determination comprises determining whether a connection between the particular wireless monitor 32 and centralized security manager 30 is available such that the wireless monitor 32 may communicate the interesting packets to centralized security manager 30 for analysis. A connection to centralized security manager 30 may not be available at any particular time for a variety of reasons, such as a problem occurring in the communication link between wireless monitor 32 and centralized security manager 30 or centralized security manager 30 may be temporarily off-line, for example. If packet routing module 64 determines that particular interesting packets are to be analyzed by centralized security manager 30, packet routing module may be operable to communicate the interesting packets to the centralized security manager. For example, in the embodiment shown in FIG. 1, packet routing module 64 may communicate the interesting packets from wireless monitor 32 to centralized security manager 30 via communications network 18.

Packet analysis module 66 may be operable to analyze particular interesting packets if packet routing module 64 determines that such interesting packets are to be analyzed locally. Packet analysis module 66 may analyze particular interesting packets to determine whether the communication session with which the interesting packets are associated is a valid or authorized session. In some embodiments, packet analysis module 66 may analyze interesting packets in a similar or identical manner as centralized security manager 30, which is described below in greater detail.

Alert module 68 may be operable to generate and communicate an alert if packet analysis module 66 identifies an invalid or unauthorized session. For example, alert module 68 may send an alert, such as a page or email, for example, to appropriate security personnel and/or to any one or more authorized access points 22 or authorized clients 36 associated with the unauthorized communication session or with wireless LAN 20. Alert module 68 may also be operable to store the alert (or a record of the alert) and to communicate the stored alert to centralized security manager 30 at some later time. For example, in a situation in which particular interesting packets are analyzed locally because a communication link to send the packets to centralized security manager 30 is not currently available, alert module 68 may generate an alert if an invalid or unauthorized session is identified by packet analysis module 66, store the alert, and communicate the alert to centralized security manager 30 after the connection between the wireless monitor 32 and centralized security manager 30 has been restored. As discussed below, in particular embodiments centralized security manager 30 may then resend the alert.

Countermeasure module 70 may be operable to initiate or direct a countermeasure in response to an invalid or unauthorized communication session determined by packet analysis module 66. For example, if an unauthorized client 38 is identified, countermeasure module 70 may be operable to disassociate the unauthorized client 38 from all authorized access points 22 associated with wireless LAN, thus preventing the unauthorized client 38 from gaining access to the data network 12 through any authorized access points 22. As another example, countermeasure module 70 may redirect unauthorized client 38 to a honey pot which may trick unauthorized client 38 into believing that unauthorized client 38 is progressing through the actual data network 12. This technique may be used to keep unauthorized client 38 connected long enough to contact security personnel or law enforcement and/or to detect the methods of attack used by unauthorized client 38 in order to deter or prevent future attacks. In particular embodiments, countermeasure module 70 is operable to initiate or direct such countermeasures in response to commands received from appropriate security personnel. In other embodiments, countermeasure module 70 may be operable to automatically initiate or direct such countermeasures (in other words, without direction from security personnel) if an invalid or unauthorized communication session is identified.

Session database 72 may store a record of one or more authorized and/or unauthorized communications sessions associated with wireless LAN 20 or data network 12. In addition, wireless monitor 32 may communicate such records to centralized security manager 30. For example, in a situation in which particular interesting packets are analyzed locally because a communication link to send the packets to centralized security manager 30 is not currently available, packet analysis module 66 may identify authorized communication sessions, generate records regarding each identified authorized session, and store the records session database 72. Wireless monitor 32 may later communicate records stored in session database 72 to centralized security manager 30 after the connection between the wireless monitor 32 and centralized security manager 30 has been restored. In addition, centralized security manager 30 may send records to session database 72 at particular times such that session database 72 may be updated.

Wireless monitors 32 may be any device operable to collect wireless signals. In a particular embodiment, each wireless monitor 32 comprises a personal digital assistant (for example, a COMPAQ IPAQ 3760), with a wireless network interface card (for example, a LUCENT ORINOCO wireless NIC), an Ethernet card (for example, a XIRCOM 10/100 NIC), and an antenna (for example, a 3 db gain antenna).

In addition, in particular embodiments, each wireless monitor 32 includes software embodied in computer-readable media and when executed operable to perform one, some, or all of the functions of packet sniffing module 60, packet filtering module 62, packet routing module 64, packet analysis module 66, alert module 68, countermeasure module 70, and session database 72, as described above.

Figure 3:
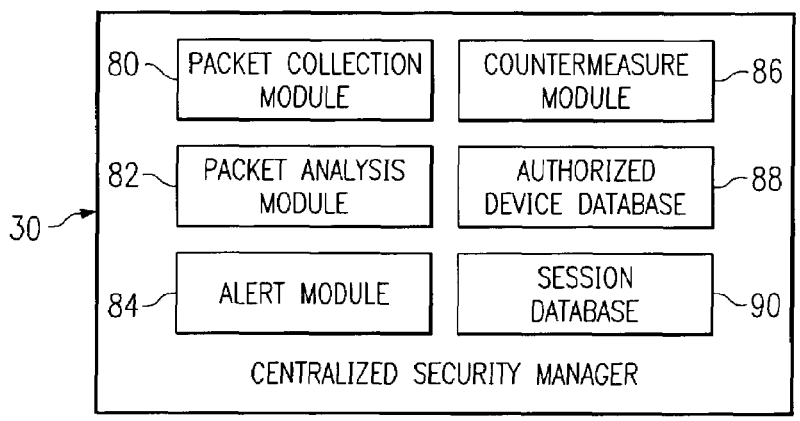
FIG. 3 illustrates an example centralized security manager in accordance with an embodiment of the present invention.

FIG. 3 illustrates an example centralized security manager 30 in accordance with an embodiment of the present invention. Centralized security manager 30 may include various modules operable to perform various functions, including a packet collection module 80, a packet analysis module 82, an alert module 84, a countermeasure module 86, an authorized device database 88, and a session database 90.

Packet collection module 80 may be operable to receive and/or log interesting packets selected by wireless monitors 32 and communicated to centralized security manager 30 for analysis. For example, packet collection module 80 may receive particular interesting packets which a wireless monitor 32 has determined are to be analyzed by centralized security manager 30 rather than locally by the wireless monitor 32. Packet collection module 80 may also be operable to sort and keep separate interesting packets received from each wireless monitor 32 and associated with a number of communication sessions.

Packet analysis module 82 may be operable to analyze interesting packets received by packet collection module 80. Generally, packet analysis module 82 is operable to analyze interesting packets to determine whether the communication session with which the interesting packets are associated is a valid or authorized session.

In some embodiments, the analysis of a packet performed by packet analysis module 82 includes a number of operations. For example, packet analysis module 82 may first determine whether the communication session with which the interesting packet is associated is a new communication session or an already established communication session, then determine whether the packet was originally communicated from a wireless client (such as an authorized or unauthorized client 26 or 38) or from a wireless access point (such as an authorized or rogue access point 22 or 36), and then determine whether the communication session is a valid or authorized session based on further analysis of the packet.

To determine whether the communication session is a new communication session or an already established communication session, packet analysis module 82 may first determine whether the packet is a data packet or a beacon packets. A beacon packet may be a packet communicated in a beacon broadcast by a wireless access point or client, such as a beacon broadcast by a wireless client searching for an wireless access point with which to communicate. Data packets may include packets communicated by a wireless access point or client in any manner other than a beacon broadcast. After determining whether the packet is a data packet or a beacon packet, packet analysis module 82 may then determine which portions of the packet are interesting and split the packet to extract the interesting portions. Packet analysis module 82 may then format the extracted interesting portions such that the interesting portions may be properly analyzed. Packet analysis module 82 may then compare the formatted interesting portions with a database of information to determine whether the communication session with which the interesting packet is associated is a new communication session or an already established communication session. In particular embodiments, packet analysis module 82 may then compare the formatted interesting portions with a beacon packet information database if the packet is a beacon packet and a data packet information database if the packet is a data packet.

In some embodiments, centralized security manager 30 is generally operable to prevent the establishment of unauthorized communication sessions in real time. Thus, centralized security manager 30 may not be concerned with packets associated with communication sessions identified as established communication sessions by packet analysis module 82. Thus, if packet analysis module 82 determines that the communication session discussed above is an established communication session, centralized security manager 30 may not take any affirmative counteractive measure. Centralized security manager 30 may, however, be operable to check and/or update session database 90 to reflect that the established communication session is still ongoing.

However, if packet analysis module 82 determines that the communication session is a new communication session, packet analysis module 82 may further examine the packet (or at least the interesting portions of the packet) to determine whether the communication session is valid or authorized. For example, as mentioned above, packet analysis module 82 may be operable to determine whether the packet was originally communicated from a wireless client (such as an authorized or unauthorized client 26 or 38) or from a wireless access point (such as an authorized or rogue access point 22 or 36). In particular embodiments, packet analysis module 82 may make this determination based on one or more bits in the packet that are turned on or off depending on whether the packet was communicated from a wireless client or a wireless access point. In one embodiment, packet analysis module 82 may determine whether the packet was originally communicated from a wireless client or a wireless access point by analyzing a portion of the MAC (Media Access Control) address associated with the packet.

Packet analysis module 82 may then perform further analysis to determine whether the communication session is valid or authorized. The particular analysis may depend on whether the packet was identified as coming from a wireless client or a wireless access point. For example, in particular embodiments, if the packet was identified as coming from a wireless client, packet analysis module 82 may perform an analysis that includes one or more of the following determinations. First, packet analysis module 82 may determine the manufacturer of the wireless client. In one embodiment, the manufacturer of the wireless client is determined by the MAC address associated with the packet. Packet analysis module 82 may then determine whether the manufacturer of the wireless client is the same as the manufacturer of any of the authorized clients 26. For example, authorized device database 88 may include a list of the manufacturer of each authorized client 26, and packet analysis module 82 may compare the manufacturer of the wireless client with the list. If the manufacturer of the wireless client does not match the manufacturer of any authorized client 26, packet analysis module 82 may determine that the wireless client is an unauthorized client 38 and that the communications session is thus invalid or unauthorized.

Packet analysis module 82 may also determine whether one or more particular security measures are turned on or off. For example, packet analysis module 82 may determine whether the wired equivalent privacy (WEP) associated with the wireless client is turned on or off. Packet analysis module 82 may be operable to determine whether the WEP is turned on or off based on a particular bit in the packet header. In particular embodiments, if packet analysis module 82 determines that the WEP is turned off, packet analysis module 82 may determine that the wireless client is an unauthorized client 38 and that the communications session is thus invalid or unauthorized.

In particular embodiments, packet analysis module 82 may also determine whether the MAC address of the wireless client matches the MAC address of any of the authorized clients 26. For example, authorized device database 88 may include a list of the MAC address for each authorized client 26, and packet analysis module 82 may compare the MAC address of the wireless client with the list. If the MAC address of the wireless client does not match the MAC address of any authorized client 26, packet analysis module 82 may determine that the wireless client is an unauthorized client 38 and that the communications session is thus invalid or unauthorized.

Thus, regarding packets originally communicated from a wireless client, packet analysis module 82 may determine whether a communication session is valid or authorized based at least on one or more of the determinations discussed above, namely, whether the manufacturer of the wireless device matches the manufacturer of any of the authorized clients 26, whether the WEP associated with the wireless client is turned on, and whether the MAC address of the wireless device matches the MAC address of any of the authorized clients 26. In a particular embodiment, packet analysis module 82 may determine that a particular communication session is valid or authorized only if the manufacturer of the wireless client matches the manufacturer of at least one authorized client 26, the WEP associated with the wireless client is turned on, and the MAC address of the wireless client matches the MAC address of one of the authorized clients 26.

Alternatively, if the packet was identified as coming from a wireless access point, packet analysis module 82 may perform an analysis that includes one or more of the following determinations. First, packet analysis module 82 may determine the manufacturer of the wireless access point and whether the manufacturer of the wireless access point is the same as the manufacturer of any of the authorized access points 22, as discussed above regarding the analysis of a packets from a wireless client. If it is determined that the manufacturer of the wireless access point is not the same as the manufacturer of any of the authorized access points 22, packet analysis module 82 may determine that the wireless access point is an unauthorized access point 36 and that the communications session is thus invalid or unauthorized.

Packet analysis module 82 may also determine whether one or more particular security measures, such as the WEP, are turned on or off, as discussed above regarding the analysis of a packets from a wireless client. In particular embodiments, if packet analysis module 82 determines that the WEP is turned off, packet analysis module 82 may determine that the wireless access point is an unauthorized access point 36 and that the communications session is thus invalid or unauthorized.

In particular embodiments, packet analysis module 82 may also determine whether the service set identifier (SSID) of the wireless access point matches the SSID of the authorized access points 22. In particular embodiments, the SSID for each authorized access points 22 should be the same. If the SSID of the wireless access point does not match the SSID of one or more authorized access points 22, packet analysis module 82 may determine that the wireless access point is an unauthorized access point 36 and that the communications session is thus invalid or unauthorized.

In addition, packet analysis module 82 may also determine whether the Basic Service Set (BSS) MAC address of the wireless access point matches the BSS MAC address of any of the authorized access points 22. For example, authorized device database 88 may include a list of the BSS MAC address for each authorized access point 22, and packet analysis module 82 may compare the BSS MAC address of the wireless access point with the list. If the BSS MAC address of the wireless access point does not match the BSS MAC address of any authorized access point 22, packet analysis module 82 may determine that the wireless access point is an unauthorized access point 36 and that the communications session is thus invalid or unauthorized.

In addition, packet analysis module 82 is also operable to determine whether the wireless access point is broadcasting. In particular embodiments, authorized access points 22 are configured to respond to communications received from wireless devices, but to not broadcast signals. In such embodiments, if packet analysis module 82 determines that the wireless access point is broadcasting signals, packet analysis module 82 may determine that the wireless access point is an unauthorized access point 36 and that the communications session is thus invalid or unauthorized.

Thus, regarding packets originally communicated from a wireless access point, packet analysis module 82 may determine whether a communication session is valid or authorized based at least on one or more of the determinations discussed above, namely, whether the manufacturer of the wireless device matches the manufacturer of any of the authorized access points 22, whether the WEP associated with the wireless access point is turned on, whether the SSID of the wireless device matches the SSID of the authorized access points 22, whether the BSS MAC address of the wireless device matches the MAC address of any of the authorized access points 22, and whether the wireless access point is broadcasting signals. In a particular embodiment, packet analysis module 82 may determine that a particular communication session is valid or authorized only if the manufacturer of the wireless access point matches the manufacturer of at least one authorized access point 22, the WEP associated with the wireless access point is turned on, the SSID of the wireless access point matches the SSID of the authorized access points 22, the MAC address of the wireless access point matches the MAC address of one of the authorized access points 22, and the wireless access point is not broadcasting.

It should be understood that packet analysis module 66 of each wireless monitor 32 may be operable to perform one, some, or all of the functions operable to be performed by packet analysis module 82 of centralized security manager 30. For example, each wireless monitor 32 may include similar or identical software as centralized security manager 30 in order to perform one, some, or all of the functions performed by packet analysis module 82.

Alert module 84 may be operable to generate and communicate an alert if packet analysis module 82 identifies an invalid or unauthorized session. For example, alert module 84 may send an alert, such as by page or email, for example, to appropriate security personnel and/or to any one or more authorized access points 22 or authorized clients 36 associated with the unauthorized communication session or with wireless LAN 20. Alert module 84 may also be operable to store a record of each alert.

Countermeasure module 86 may be operable to initiate or direct a countermeasure in response to an invalid or unauthorized communication session determined by packet analysis module 82. Countermeasure module 86 may be operable to initiate or direct a variety of countermeasures, such as those discussed above with reference to countermeasure module 70. As discussed above regarding countermeasure module 70, in particular embodiments countermeasure module 86 may be operable to initiate or direct such countermeasures in response to commands received from appropriate security personnel. In other embodiments, countermeasure module 86 may be operable to automatically initiate or direct such countermeasures (in other words, without direction from security personnel) if an invalid or unauthorized communication session is identified.

Session database 90 may store a record of one or more authorized and/or or unauthorized communications sessions associated with each campus 16 of data network 12. In addition, centralized security manager 30 may from time to time communicate such records to one or more wireless devices 32 such that session databases 72 associated with wireless devices 32 may be updated.

In particular embodiments, centralized security manager 30 includes software embodied in computer-readable media and when executed operable to perform one, some, or all of the functions of packet collection module 80, packet analysis module 82, alert module 84, countermeasure module 86, authorized device database 88, and session database 90, as described above.

Figure 4:
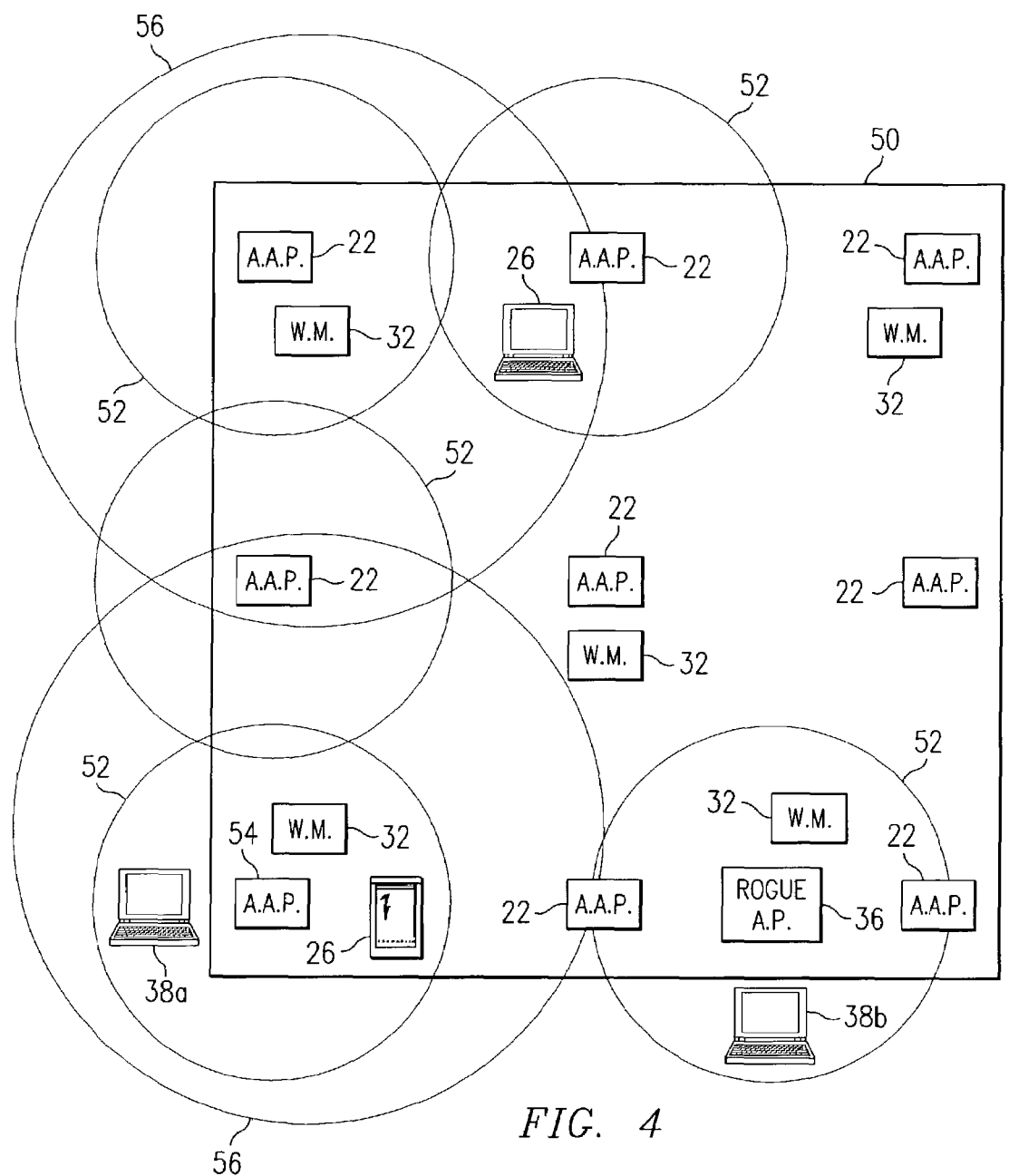
FIG. 4 is a top view of a floor in a building, illustrating an example configuration of a portion of wireless LAN and a campus security network in accordance with an embodiment of the present invention.

FIG. 4 is a top view of a floor in an office building, illustrating an example configuration of at least a portion of wireless LAN 20 and campus security network 28. A plurality of authorized access points 22 connected to campus backbone network 18 are geographically dispersed to create a particular area of coverage to support wireless communications with authorized mobile clients 26. The area of coverage 52 of each authorized access point 22 may depend on a variety of factors, such as the characteristics of the particular authorized access point 22, the location of the authorized access point 22 within building 50, and the presence of physical structures which may obstruct wireless communications in the vicinity of the authorized access point 22, for example. The area of coverage 52 of each authorized access point 22 may also extend in a vertical direction, and may thus provide coverage for more than one floor of building 50. As shown in FIG. 4, the area of coverage 52 of particular authorized access points 22 may extend beyond one or more outer walls of building 50, thus potentially providing authorized and unauthorized clients 26 and 38 access to data network 12 through such authorized access points 22. For example, as shown in FIG. 4, an unauthorized client 38*a* may be located outside of building 50 but within the area of coverage 52 of a particular authorized access point 54 of the authorized access points 22, and thus able to communicate with the particular authorized access point 54. Thus, unauthorized mobile client 38*a* may attempt to access data network 12 via authorized access point 54 while remaining outside building 50.

In addition, one or more rogue access points 36 may also be connected to campus backbone network 18. As discussed above with reference to FIG. 1, rogue access points 36 may be connected to campus backbone network 24 by internal employees desiring mobile access to data network 12 or by an outside attacker desiring access to data network 12. Rogue access points 36 may also include access points that were authorized to be connected to campus backbone network 24, but are misconfigured in some way. The area of coverage 52 of a rogue access point 36 may extend outside building 50, thus potentially providing authorized and unauthorized clients 26 and 38 access to data network 12 through the rogue access point 36. For example, as shown in FIG. 4, an unauthorized client 38*b* may be located outside of building 50 but within the area of coverage 52 of a particular rogue access point 36, and thus able to communicate with the particular rogue access point 36. Thus, unauthorized mobile client 38*b* may attempt to access data network 12 via rogue access point 36 while remaining outside building 50.

As shown in FIG. 4, a plurality of wireless monitors 32 are geographically dispersed to create a particular area of coverage to monitor wireless communications associated with wireless LAN, including wireless communications between authorized and rogue access points 22 and 36 and authorized and unauthorized clients 26 and 38. Like the area of coverage 52 of each access point 22, the area of coverage 56 of each wireless monitor 32 may depend on a variety of factors, such as the characteristics of the particular wireless monitor 32, the location of the wireless monitor 32 within building 50, and the presence of physical structures which may obstruct wireless communications in the vicinity of the wireless monitor 32, for example. The area of coverage 56 of each wireless monitor 32 may also extend in a vertical direction, and each wireless monitor 32 may monitor portions of more than one floor of building 50. For example, in a particular embodiment, wireless monitors 32 are located in the ceiling between two floors of a building and are operable to monitor wireless communications in both floors. In addition, as shown in FIG. 4, the area of coverage 56 of particular wireless monitors 32 may extend outside building 50, thus providing the ability to monitor wireless communications outside building 50. The area of coverage 56 of the wireless monitors 32 located in a particular building may substantially or completely cover the area of coverage 52 of the authorized access points 22 located in the building.

Figure 5:
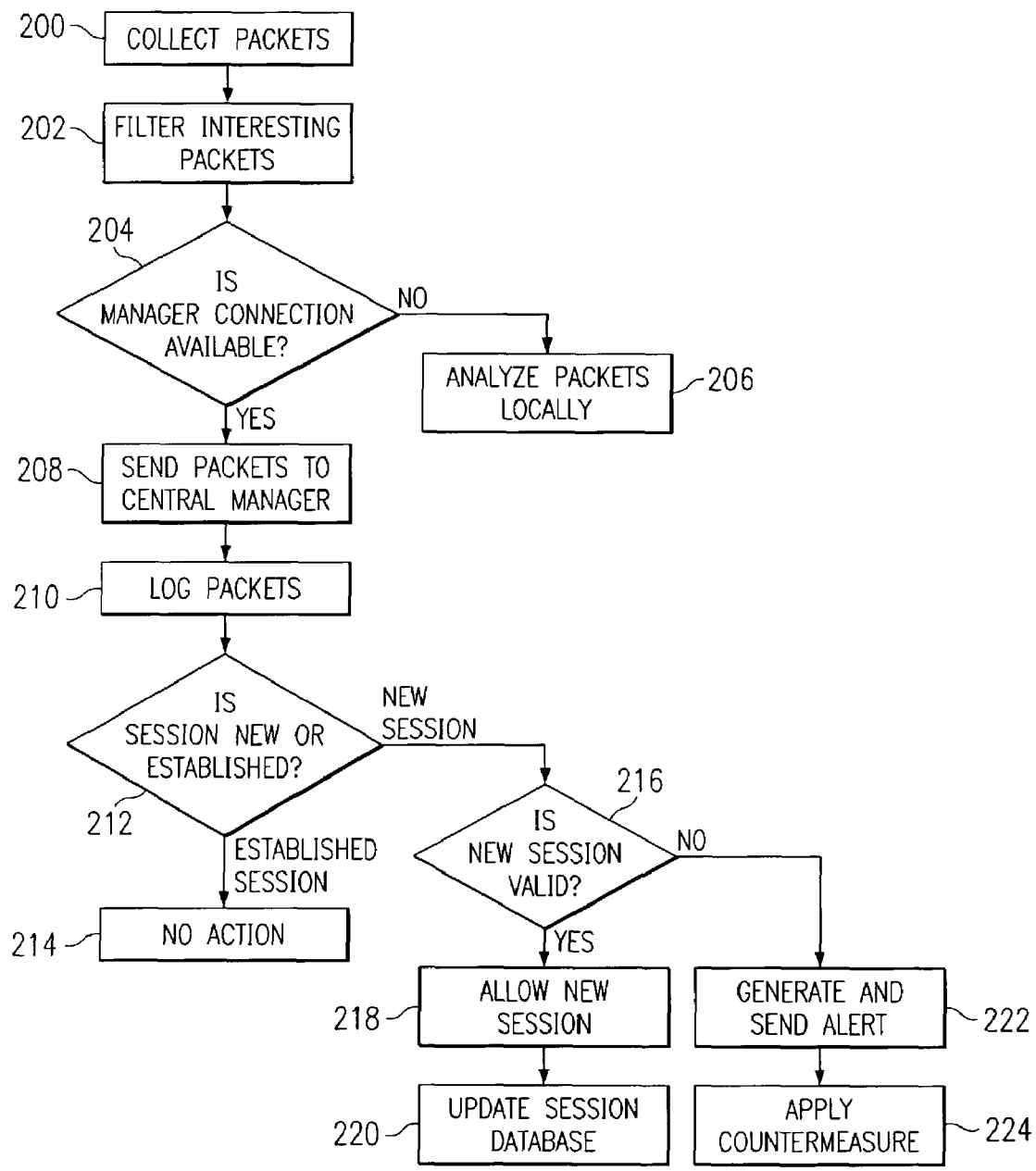
FIG. 5 illustrates a method of monitoring communication sessions in a wireless network, such as a wireless LAN, in accordance with an embodiment of the present invention.

FIG. 5 illustrates a method of monitoring communication sessions in a wireless network, such as wireless LAN 20. At step 200, one or more packets of information communicated from a wireless device are received by one of a plurality of monitoring devices (such as wireless monitors 32, for example). The monitoring devices may be operable to monitor a network (such as wireless LAN 20, for example) having a plurality of authorized devices. For example, the plurality of authorized devices may include a plurality of authorized wireless access points (such as authorized wireless access points 38) and a plurality of authorized wireless clients (such as authorized mobile clients 26). The one or more packets of information may be associated with a communication session, as discussed above with reference to FIG. 2.

At step 202, the monitoring device may filter the one or more received packets to select a relevant, or interesting, packet. For example, interesting packets may include packets concerning the authentication, authorization, and/or establishment of a communication session, such as packets communicated during key exchange handshaking, for example.

At step 204, it is determined whether a connection between the monitoring device and a centralized security manager is available such that the monitoring device may communicate the interesting packet to the centralized security manager for analysis. If it is determined at step 204 that a connection between the monitoring device and the centralized security manager is not available, the monitoring device may analyze the interesting packet locally at step 206 to determine whether the communication session with which the interesting packet is associated is valid or authorized. Alternatively, if it is determined at step 204 that a connection with the centralized security manager is available, the interesting packet is sent from the monitoring device to the centralized security manager at step 208. For example, in the embodiment shown in FIG. 1, the interesting packet may be communicated from the monitoring device to the centralized security manager via communications network 18.

At step 210, the interesting packet is logged into a packet database associated with the centralized security manager. At step 212, the centralized security manager may determine whether the communication session with which the interesting packet is associated is a new session or an established session. This decision is described in greater detail below with reference to FIG. 6. If it is determined that the communication session is an established session, no action is taken by the centralized security manager at step 214. However, if it is determined that the communication session is a new session, the centralized security manager determines whether the new session is valid or authorized at step 216. This determination is described in greater detail below with reference to FIG. 7.

If it is determined at step 216 that the new session is valid or authorized, the centralized security manager allows the new session to be established at step 218. In some embodiments, this may involve no proactive action by the centralized security manager. At step 220, a communication session database associated with the centralized security manager may be updated to reflect the new session being established.

Alternatively, if it is determined at step 216 that the new session is invalid or unauthorized, the centralized security manager may generate an alert at step 222. The centralized security manager may communicate the alert to appropriate security personnel. In particular embodiments, the centralized security manager may additionally or alternatively communicate the alert to the monitoring device, the wireless devices to and from which the interesting packets were communicated, and/or one or more other wireless access points and wireless clients associated with the attempted communication session.

In some embodiments, the security personnel and/or the centralized security manager may also initiate or direct a countermeasure at step 224 in response to the invalid or unauthorized communication session. For example, if it is determined that the wireless device is an unauthorized wireless client, the unauthorized wireless client may be disassociated from all of the plurality of wireless access points, thus preventing the unauthorized wireless client from gaining access to the network through any of the wireless access points. As another example, the attacker may be redirected to a honey pot that may trick the attacker into believing that the attacker is progressing through the actual data network. This technique may be used to keep the attacker connected in order to contact security personnel or law enforcement and/or to detect the attacker's methods in order to deter or prevent future attacks.

Figure 6:
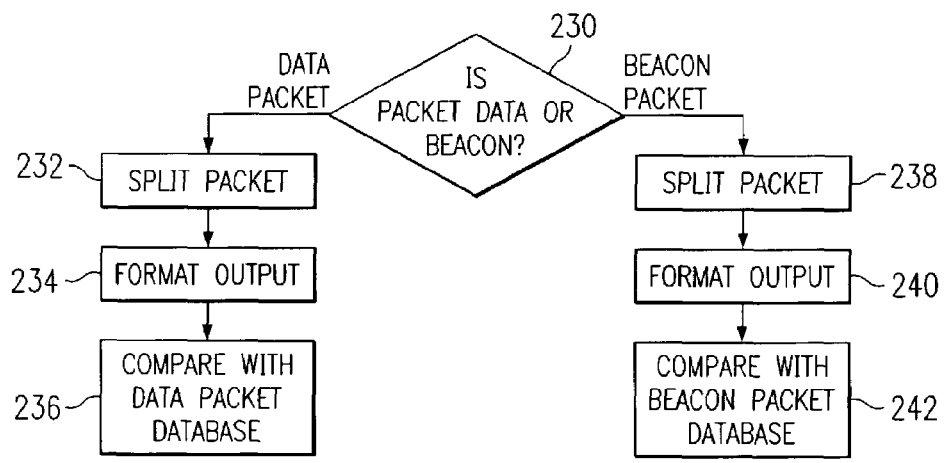
FIG. 6 illustrates a method of analyzing an interesting packet at a centralized security manager to determine whether a communication session is new or established in accordance with an embodiment of the present invention.

FIG. 6 illustrates a method of determining whether a communication session with which an interesting packet is associated is a new session or an established session, as described above regarding step 212 of FIG. 5. At step 230, it is determined whether the packet is a data packet or a beacon packet. As discussed above, a beacon packet may be a packet communicated in a beacon broadcast by a wireless access point or client, such as a probe frame transmitted by a wireless client in search of a wireless access point.

If it is determined that the packet is a data packet, the packet may be split at step 232 to extract interesting portions of the packet. The interesting portions of the packet may then be formatted at step 234 such that the interesting portions may be properly analyzed. At step 236, the formatted interesting portions may be compared with a database of data packet information to determine whether the communication session with which the data packet is associated is a new communication session or an already established communication session.

Similarly, if it is determined that the packet is a beacon packet, the packet may be split at step 238 to extract interesting portions of the packet. The interesting portions of the packet may then be formatted at step 240 and compared with a database of beacon packet information at step 242 to determine whether the communication session with which the beacon packet is associated is a new communication session or an already established communication session.

Figure 7:
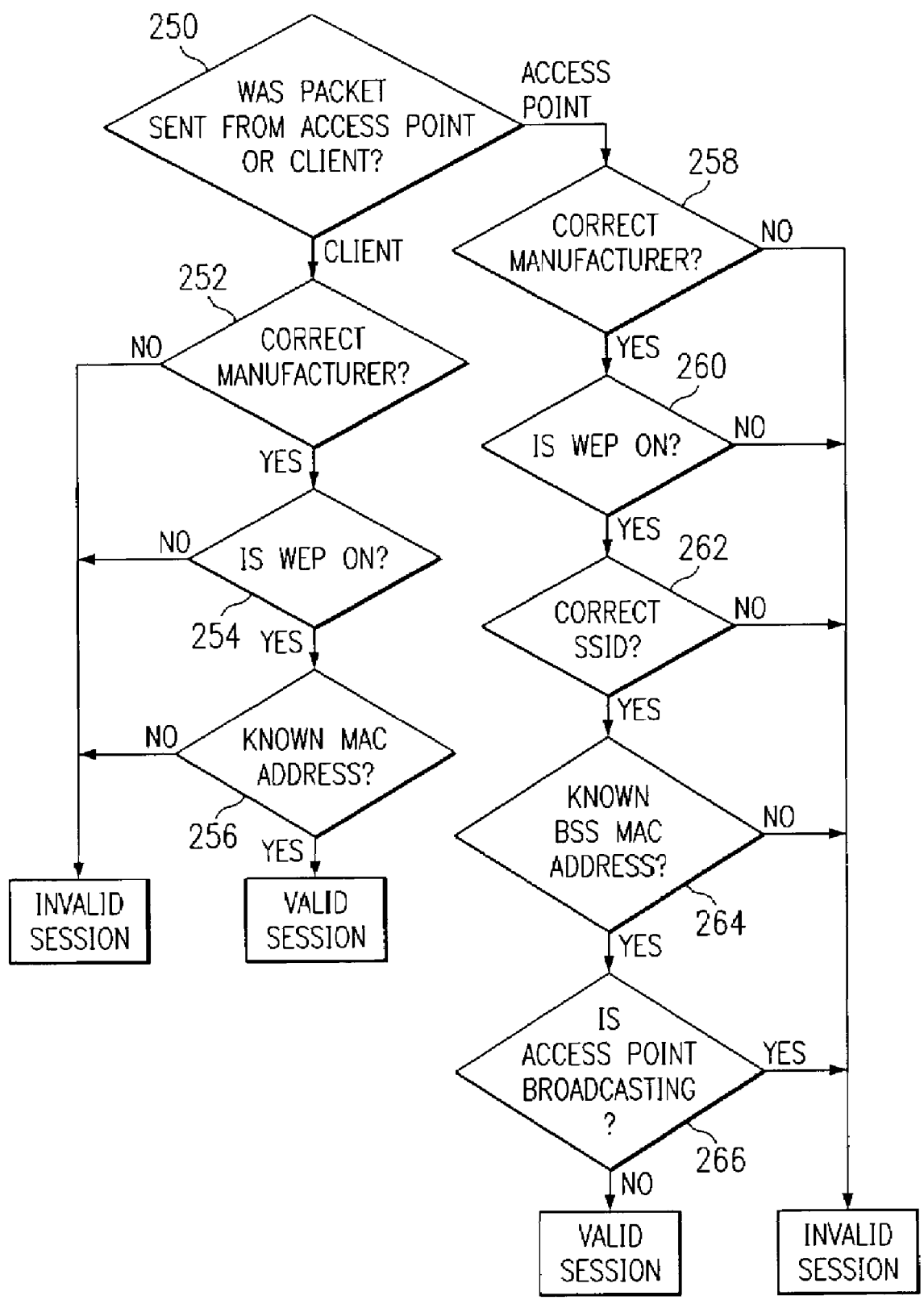
FIG. 7 illustrates a method of analyzing the interesting packet at the centralized security manager to determine whether the communication session of FIG. 6 is authorized.

FIG. 7 illustrates a method of determining whether a communication session with which an interesting packet is associated is valid or authorized, as described above regarding step 216 of FIG. 5. At step 250, it may be determined whether the packet was originally communicated from a wireless client (such as an authorized or unauthorized client 26 or 38) or from a wireless access point (such as an authorized or rogue access point 22 or 36). In particular embodiments, this determination may include analyzing one or more bits in the packet that are turned on or off depending on whether the packet was communicated from a wireless client or a wireless access point. In one embodiment, the determination includes analyzing a portion of the MAC address associated with the packet.

If it is determined at step 250 that the packet was communicated from a wireless client, the packet may be further analyzed at steps 252 through 256 to determine whether the communication session is valid or authorized. Alternatively, if it is determined at step 250 that the packet was communicated from a wireless access point, the packet may be further analyzed at steps 258 through 266 to determine whether the communication session is valid or authorized.

At step 252, it may be determined whether the manufacturer of the wireless client matches the manufacturer of any authorized client. In particular embodiments, this may include determining the manufacturer of the wireless client by analyzing the MAC address associated with the packet and comparing the manufacturer of the wireless client with a list of the manufacturers of each authorized client in the network, which may be stored in an authorized device database. As shown in FIG. 7, if the manufacturer of the wireless client does not match the manufacturer of any authorized client, it may be determined that the wireless client is an unauthorized client and that the communications session is thus unauthorized.

At step 254, whether one or more particular security measures are turned on or off may be determined. For example, this may include determining whether the wired equivalent privacy (WEP) associated with the wireless client is turned on or off. As shown in FIG. 7, if it is determined that the WEP is turned off, it may be determined that the wireless client is an unauthorized client and that the communications session is thus unauthorized.

At step 256, it may be determined whether the MAC address of the wireless client matches the MAC address of any of the authorized clients. This may include comparing the MAC address of the wireless client with a list of the MAC address for each authorized client. If the MAC address of the wireless client does not match the MAC address of any authorized client, it may be determined that the wireless client is an unauthorized client and that the communications session is thus unauthorized.

Thus, as shown in FIG. 7, it may be determined that the wireless client is an authorized client and that the communications session is thus authorized if the manufacturer of the wireless client matches the manufacturer of at least one authorized client, the WEP associated with the wireless client is turned on, and the MAC address of the wireless client matches the MAC address of one of the authorized clients.

As discussed above, it is determined at step 250 that the packet was communicated from a wireless access point, the packet may be further analyzed at steps 258 through 266 to determine whether the communication session is valid or authorized. At step 258, it may be determined whether the manufacturer of the wireless access point matches the manufacturer of any authorized access point, such as described above regarding step 252. At step 260, it may be determined whether one or more particular security measures are turned on or off, such as described above regarding step 254. At step 262, it may be determined whether the SSID of the wireless access point matches the SSID of one or more authorized access points. At step 264, it may be determined whether the BSS MAC address of the wireless access point matches the BSS MAC address of one or more authorized access points This may include comparing the BSS MAC address of the wireless access point with a list of the BSS MAC address for each authorized access point. If the BSS MAC address of the wireless access point does not match the BSS MAC address of any authorized access point, it may be determined that the wireless access point is an unauthorized access point and that the communications session is thus unauthorized.

At step 266, whether the wireless access point is broadcasting may be determined. In particular embodiments, authorized access points are configured to not broadcast signals. Thus, in such embodiments, if it is determined that the wireless access point is broadcasting signals, it may be determined that the wireless access point is an unauthorized access point and that the communications session is thus unauthorized.

Thus, as shown in FIG. 7, it may be determined that the wireless access point is an authorized access point and that the communications session is thus authorized if the manufacturer of the wireless access point matches the manufacturer of at least one authorized access point, the WEP associated with the wireless access point is turned on, the SSID of the wireless access point matches the SSID of the authorized access points, the BSS MAC address of the wireless access point matches the BSS MAC address of one of the authorized access points, and the wireless access point is not broadcasting signals.

FIG. 8 illustrates a method of analyzing an interesting packet locally at a wireless monitor to determine whether a communication session associated with the packet is valid or authorized, as described above regarding step 206 of FIG. 5. For example, as described above regarding step 204 of FIG. 5, an interesting packet may be analyzed locally if a communication link to send the packets to the centralized security manager is not currently available.

At step 280, the interesting packet may be logged locally by the monitoring device, such as in a packet database or packet queue, for example. At step 282, the monitoring device may determine whether the communication session with which the interesting packet is associated is a new session or an established session. If it is determined that the communication session is an established session, no action is taken by the monitoring device at step 284. However, if it is determined that the communication session is a new session, the monitoring device may determine whether the new session is valid or authorized at step 286. If it is determined that the new session is invalid or unauthorized, the monitoring device may generate an alert at step 288. The monitoring device may communicate the alert to appropriate security personnel and/or one or more wireless access points and wireless clients associated with the attempted communication session, such as the wireless devices to and from which the interesting packets were communicated. In some embodiments, the security personnel and/or the monitoring device may also initiate or direct a countermeasure at step 290 in response to the invalid or unauthorized communication session. In some embodiments, one or more of the actions taken or functions performed by the monitoring device at steps 280 through 290 are similar or identical to the actions taken or functions performed by the central security manager at steps 210 through 216 and 222 through 224.

Alternatively, if it is determined at step 286 that the new session is valid or authorized, the monitoring device may allow the new session to be established at step 292. In some embodiments, this may involve no proactive action by the monitoring device. At step 294, a record of the approved communication session may be stored in a database or backlog associated with the monitoring device. At step 296, the monitoring device may determine whether a connection with the centralized security manager is currently available. If such a connection is available, the monitoring device may send the record of the approved communication session, or the updated backlog, to the centralized security manager at step 298 such that the centralized security manager may update a communication session database to reflect the new session being established. If a connection with the centralized security manager is not available at step 296, the monitoring device may wait at step 300 until a connection becomes available in order to pass the relevant records to the centralized security manager. The monitoring device and the centralized security manager may communicate with each other to keep their respective database updated or synchronized.

Although an embodiment of the invention and its advantages are described in detail, a person skilled in the art could make various alterations, additions, and omissions without departing from the spirit and scope of the present invention as defined by the appended claims.

What is claimed is:

1. A system for monitoring a wireless network, comprising:
   a security network including a plurality of monitoring devices coupled to a centralized security manager, the security network operable to manage access to a data network associated with a plurality of authorized devices;
   wherein each monitoring device comprises:
      a packet sniffing module operable to receive packets communicated from one or more wireless device, each packet associated with a communication session;
      a packet filtering module operable to:
         filter the received packets to identify any packets associated with the establishment of a communication session: and
         select one or more packets identified as being associated with the establishment of a communication session for communication to the centralized security manager; and
      a packet routing module operable to communicate one or more of the selected packets to the centralized security manager; and
   wherein the centralized security manager comprises:
      a packet collection module operable to receive the one or more selected packets communicated from each monitoring device;
      a packet analysis module operable to:
         analyze the one or more packets; and
         determine whether a particular communication session is valid based on the analysis of at least one particular packet associated with a particular wireless device; and
      an alert module operable to communicate an alert if the particular communication session is not valid;
   wherein the plurality of authorized devices includes a plurality of authorized wireless access points and a plurality of authorized wireless clients, each of the wireless access points operable to provide one or more of the authorized wireless clients access to the data network; and
   the centralized security manager further comprises a countermeasure module operable to prevent the wireless device access to the data network via each of the plurality of wireless access points if the wireless device is not one of the plurality of authorized devices.

2. The system of claim 1, wherein the packet analysis module of the centralized security manager is further operable to determine whether the particular communication session is a new session or an existing session based on the analysis of the at least one particular packet.

3. The system of claim 1, wherein the centralized security manager further comprises a countermeasure module operable to direct the wireless device to a honey pot if the particular wireless device is not one of the plurality of authorized devices.

4. The system of claim 1, wherein the centralized security manager further comprises a countermeasure module operable to update a session database based on the determination of whether the particular communication session is valid.

5. A system for monitoring a wireless network, comprising:
   a security network including a plurality of monitoring devices coupled to a centralized security manager, the security network operable to manage access to a data network associated with a plurality of authorized devices:
   wherein each monitoring device comprises:
      a packet sniffing module operable to receive packets communicated from one or more wireless device, each packet associated with a communication session:
      a packet filtering module operable to:
         filter the received packets to identify any packets associated with the establishment of a communication session: and
         select one or more packets identified as being associated with the establishment of a communication session for communication to the centralized security manager: and
      a packet routing module operable to communicate one or more of the selected packets to the centralized security manager: and
   wherein the centralized security manager comprises:
      a packet collection module operable to receive the one or more selected packets communicated from each monitoring device:
      a packet analysis module operable to:
         analyze the one or more packets: and
         determine whether a particular communication session is valid based on the analysis of at least one particular packet associated with a particular wireless device: and an alert module operable to communicate an alert if the particular communication session is not valid
   wherein: the plurality of authorized devices includes a plurality of wireless access points and a plurality of authorized wireless clients, each of the wireless access points operable to provide one or more of the authorized wireless clients access to the data network;
   the packet analysis module of the centralized security manager is further operable to determine whether the particular wireless device is a wireless access point or a wireless client based on the analysis of the at least one particular packet; and
   the packet analysis module of the centralized security manager is operable to determine whether the particular wireless device is one of the plurality of authorized devices by:

determining whether the wireless access point is one of the plurality of authorized wireless access points if the particular wireless device is a wireless access point; and determining whether the wireless client is one of the plurality of authorized wireless clients if the particular wireless device is a wireless client.

6. The system of claim 5, wherein the packet analysis module of the centralized security manager is operable to determine whether the wireless client is one of the plurality of authorized wireless clients at least by:

determining the manufacturer of the wireless client; and determining whether the manufacturer of the wireless client matches the manufacturer of at least one of the plurality of authorized wireless clients.

7. The system of claim 5, wherein the packet analysis module of the centralized security manager is operable to determine whether the wireless client is one of the plurality of authorized wireless clients at least by determining whether the wired equivalency privacy (WEP) associated with the wireless client is turned on.

8. The system of claim 5, wherein the packet analysis module of the centralized security manager is operable to determine whether the wireless client is one of the plurality of authorized wireless clients at least by determining whether the MAC address of the wireless client matches the MAC address of any of the plurality of authorized wireless clients.

9. The system of claim 5, wherein the packet analysis module of the centralized security manager is operable to determine whether the wireless access point is one of the plurality of authorized wireless access points at least by:

determining the manufacturer of the wireless access point; and determining whether the manufacturer of the wireless access point matches the manufacturer of at least one of the plurality of authorized wireless access points.

10. The system of claim 5, wherein the packet analysis module of the centralized security manager is operable to determine whether the wireless access point is one of the plurality of authorized wireless access points at least by determining whether the wired equivalency privacy (WEP) associated with the wireless access point is turned on.

11. The system of claim 5, wherein the packet analysis module of the centralized security manager is operable to determine whether the wireless access point is one of the plurality of authorized wireless access points at least by determining whether the MAC address of the wireless access point matches the MAC address of any of the plurality of authorized wireless access points.

12. The system of claim 5, wherein the packet analysis module of the centralized security manager is operable to determine whether the wireless access point is one of the plurality of authorized wireless access points at least by determining whether the service set identifier (SSIID) of the wireless access point matches the service set identifier of each of the plurality of authorized wireless access points.

13. The system of claim 5, wherein the packet analysis module of the centralized security manager is operable to determine whether the wireless access point is one of the plurality of authorized wireless access points at least by determining whether the wireless access point is broadcasting packets.

14. A method of monitoring a wireless network, comprising:

receiving one or more packets communicated from a wireless device at one of a plurality of monitoring devices operable to monitor at least a portion of a network associated with a plurality of authorized devices; wherein the one or more packets are associated with a communication session;

filtering the one or more received packets to identify any packets associated with the establishment of a communication session;

selecting at least one particular packet associated with the establishment of a communication session for communication to the centralized security manager;

communicating at least one particular packet of the one or more packets to a centralized manager coupled to each of the plurality of monitoring devices;

analyzing the at least one particular packet;

determining whether the communication session is valid based on the analysis of the at least one particular packet;

communicating an alert if the communication session is not valid; directing the wireless device to a honey pot if the communication session is not valid.

15. The method of claim 14, wherein the plurality of authorized devices includes a plurality of authorized wireless access points and a plurality of authorized wireless clients, each of the wireless access points operable to provide one or more of the authorized wireless clients access to the data network; and wherein the method further comprises preventing the wireless device access to the network via each of the plurality of wireless access points if the communication session is not valid.

16. The method of claim 14, further comprising determining whether the communication session is a new session or an existing session based on the analysis of the at least one particular packet.

17. The method of claim 14, further comprising updating a session database associated with the centralized security manager based on the determination of whether the communication session is valid.

18. A method of monitoring a wireless network, comprising:

receiving one or more packets communicated from a wireless device at one of a plurality of monitoring devices operable to monitor at least a portion of a network associated with a plurality of authorized devices: wherein the one or more packets are associated with a communication session;

filtering the one or more received packets to identify any packets associated with the establishment of a communication session;

selecting at least one particular packet associated with the establishment of a communication session for communication to the centralized security manager;

communicating at least one particular packet of the one or more packets to a centralized manager coupled to each of the plurality of monitoring devices;

analyzing the at least one particular packet;

determining whether the communication session is valid based on the analysis of the at least one particular packet; and communicating an alert if the communication session is not valid, wherein the plurality of authorized devices includes a plurality of wireless access points and a plurality of authorized wireless clients, each of the wireless access points operable to provide one or more of the authorized wireless clients access to the data network; and wherein the method further comprises:

determining whether the wireless device is a wireless access point or a wireless client based on the analysis of the at least one data packet; and wherein determining whether the communication session is valid comprises:
if the wireless device is a wireless access point, determining whether the wireless access point is one of the plurality of authorized wireless access points; and
if the wireless device is a wireless client, determining whether the wireless client is one of the plurality of authorized wireless clients.

19. The method of claim 18, wherein determining whether the wireless client is one of the plurality of authorized wireless clients comprises:
determining the manufacturer of the wireless client; and
determining whether the manufacturer of the wireless client matches the manufacturer of at least one of the plurality of authorized wireless clients.

20. The method of claim 18, wherein determining whether the wireless client is one of the plurality of authorized wireless clients comprises determining whether the wired equivalency privacy (WEP) associated with the wireless client is turned on.

21. The method of claim 18, wherein determining whether the wireless client is one of the plurality of authorized wireless clients comprises determining whether the MAC address of the wireless client matches the MAC address of any of the plurality of authorized wireless clients.

22. The method of claim 18, wherein determining whether the wireless access point is one of the plurality of authorized wireless access points comprises:
determining the manufacturer of the wireless access point; and
determining whether the manufacturer of the wireless access point matches the manufacturer of at least one of the plurality of authorized wireless access points.

23. The method of claim 18, wherein determining whether the wireless access point is one of the plurality of authorized wireless access points comprises determining whether the wired equivalency privacy (WEP) associated with the wireless access point is turned on.

24. The method of claim 18, wherein determining whether the wireless access point is one of the plurality of authorized wireless access points comprises determining whether the MAC address of the wireless access point matches the MAC address of any of the plurality of authorized wireless access points.

25. The method of claim 18, wherein determining whether the wireless access point is one of the plurality of authorized wireless access points comprises determining whether the service set identifier (SSIID) of the wireless access point matches the service set identifier of each of the plurality of authorized wireless access points.

26. The method of claim 18, wherein determining whether the wireless access point is one of the plurality of authorized wireless access points comprises determining whether the wireless access point is broadcasting packets.

27. A system for monitoring a wireless network, comprising:
a security network including a plurality of monitoring devices coupled to a centralized security manager, the security network operable to manage access to a data network associated with a plurality of authorized devices;

wherein each monitoring device comprises:
a packet sniffing module operable to receive packets communicated from one or more wireless device;
a packet filtering module operable to:
filter the received packets to identify any packets associated with the establishment of a communication session; and
select one or more of the identified packets associated with the establishment of a communication session for communication to the centralized security manager; and
a packet routing module operable to communicate one or more of the selected packets to the centralized security manager; and
wherein the centralized security manager comprises
a packet collection module operable to receive the one or more selected packets communicated from each monitoring device;
a packet analysis module operable to:
analyze the one or more packets; and
determine based on the analysis of at least one particular packet associated with a particular wireless device whether the particular wireless device is one of the plurality of authorized devices; and
an alert module operable to communicate an alert if the particular wireless device is not one of the plurality of authorized devices;
wherein the plurality of authorized devices includes a plurality of wireless access points and a plurality of authorized wireless clients, each of the wireless access points operable to provide one or more of the authorized wireless clients access to the data network;
the packet analysis module of the centralized security manager is further operable to determine whether the particular wireless device is a wireless access point or a wireless client based on the analysis of the at least one particular packet; and
the packet analysis module of the centralized security manager is operable to determine whether the particular wireless device is one of the plurality of authorized devices by:
determining whether the wireless access point is one of the plurality of authorized wireless access points if the particular wireless device is a wireless access point; and
determining whether the wireless client is one of the plurality of authorized wireless clients if the particular wireless device is a wireless client.

28. A method of monitoring a wireless network, comprising:
receiving one or more packets communicated from a wireless device at one of a plurality of monitoring devices operable to monitor at least a portion of a network comprising a plurality of authorized wireless access points and a plurality of authorized wireless clients;
filtering the one or more received packets to identify any packets associated with the establishment of a communication session:
selecting one or more of the identified packets associated with the establishment of a communication session for communication to the centralized manager;
communicating at least one particular packet of the one or more selected packets to a centralized manager coupled to each of the plurality of monitoring devices;

analyzing the at least one particular packet;
determining whether the wireless device is one of the plurality of authorized devices based on the analysis of the at least one particular packet;
communicating an alert if the wireless device is not one of the plurality of authorized devices
determining whether the wireless device is a wireless access point or a wireless client based on the analysis of the at least one data packet; and
wherein determining whether the wireless device is one of the plurality of authorized devices comprises:
if the wireless device is a wireless access point, determining whether the wireless access point is one of the plurality of authorized wireless access points; and
if the wireless device is a wireless client, determining whether the wireless client is one of the plurality of authorized wireless clients.

29. A system for monitoring a wireless network, comprising:
a security network including a plurality of monitoring devices coupled to a centralized security manager, the security network operable to manage access to a data network associated with a plurality of authorized devices;
wherein each monitoring device comprises:
a packet sniffing module operable to receive packets communicated from one or more wireless device, each packet associated with a communication session;
a packet filtering module operable to select one or more of the received packets to be analyzed;
a packet routing module operable to:
determine whether the selected packets are to be analyzed locally or by the centralized security manager based on whether a wireless connection is available between the monitoring device and the centralized security manager; and
communicate the selected packets to the centralized security manager if it is determined that the wireless connection is available;
a packet analysis module operable to:
analyze the selected packets if it is determined that the selected packets are to be analyzed locally; and
determine whether the communication session is valid based on the analysis of the selected packets;
a local alert module operable to:
store a record regarding the communication session if it is determined by the monitoring device that the communication session is valid; and
communicate the record regarding the communication session to the centralized security manager; and
wherein the centralized security manager is further operable to update a central session database based on the record regarding the communication session; and
wherein the centralized security manager comprises:
a packet collection module operable to receive the selected packets from the monitoring device if it is determined that the selected packets are to be analyzed by the centralized security manager; and
a packet analysis module operable to:
analyze the received selected packets; and
determine whether the communication session is valid based on the analysis of the received selected packets.

30. The system of claim 29, wherein:
each monitoring device further comprises a local session database operable to store a record regarding a particular communication session if the monitoring device determines whether or not the particular communication session is valid; and
the centralized security manager is further operable to update a central session database based on the determination of whether the particular communication session is valid.

31. The system of claim 29, wherein each monitoring device further comprises an local alert module operable to:
communicate an alert if it is determined by the monitoring device that the communication session is not valid;
store a record of the alert communicated from the monitoring device; and
communicate the record of the alert to the centralized security manager.

32. A method of monitoring a wireless network, comprising:
receiving packets communicated from a wireless device at one of a plurality of monitoring devices, the one or more packets being associated with a communication session;
selecting one or more of the received packets to be analyzed;
determining whether the selected packets are to be analyzed by the monitoring device or by a centralized manager coupled to each of the plurality of monitoring devices based on whether a wireless connection is available between the monitoring device and the centralized manager;
if it is determined that the selected packets are to be analyzed by the monitoring device:
analyzing the selected packets by the monitoring device; and
determining whether the communication session is valid based on the analysis of the selected packets; and
if it is determined that the selected packets are to be analyzed by the centralized security manager:
communicating the selected packets to the centralized security manager;
analyzing the selected packets by the centralized security manager; and
determining whether the communication session is valid based on the analysis of the received selected packets; and
storing a record regarding the communication session if it is determined by the monitoring device that the communication session is valid;
communicating the record regarding the communication session to the centralized security manager; and
updating a session database associated with the centralized security manager based on the record regarding the communication session.

33. The method of claim 32, further comprising updating a session database associated with the centralized security manager based on the determination of whether the communication session is valid.

34. The method of claim 32, further comprising:
communicating an alert from the monitoring device if it is determined by the monitoring device that the communication session is not valid;
storing a record of the alert communicated from the monitoring device; and communicating the record of the alert to the centralized security manager.

35. Software for monitoring a wireless network, the software being embodied in computer-readable media and when executed operable to:
receive one or more packets communicated from a wireless device at one of a plurality of monitoring devices operable to monitor at least a portion of a network associated with a plurality of authorized devices; wherein the one or more packets are associated with a communication session;
filtering the one or more received packets to identify any packets associated with the establishment of a communication session;
selecting at least one particular packet associated with the establishment of a communication session for communication to the centralized security manager;
communicate at least one particular packet of the one or more selected packets to a centralized manager coupled to each of the plurality of monitoring devices;
analyze the at least one particular packet;
determine whether the communication session is valid based on the analysis of the at least one particular packet; and
generate an alert if the communication session is not valid,
wherein the plurality of authorized devices includes a plurality of authorized wireless access points and a plurality of authorized wireless clients, each of the wireless access points operable to provide one or more of the authorized wireless clients access to the data network, and
wherein the software, when executed, is further operable to prevent the wireless device access to the network via each of the plurality of wireless access points if the communication session is not valid.

36. A system for monitoring a wireless network, comprising:
a security network including a plurality of monitoring devices coupled to a centralized security manager, the security network operable to manage access to a data network associated with a plurality of authorized devices;
wherein each monitoring device comprises:
a packet sniffing module operable to receive packets communicated from one or more wireless device, each packet associated with a communication session;
a packet filtering module operable to identify one or more packets associated with the establishment of a communication session;
a packet analysis module operable to:
analyze the one or more packets associated with the establishment of a communication session; and
determine whether a particular communication session is valid based on the analysis of at least one particular packet associated with the establishment of a communication session;
an alert module operable to communicate an alert if the particular communication session is not valid; and
a countermeasure module operable to update a session database based on the determination of whether the particular communication session is valid.

37. The system of claim 36, wherein the packet analysis module is further operable to determine whether the particular communication session is a new session or an existing session based on the analysis of the at least one particular packet.

38. The system of claim 36, wherein:
the plurality of authorized devices includes a plurality of authorized wireless access points and a plurality of authorized wireless clients, each of the wireless access points operable to provide one or more of the authorized wireless clients access to the data network; and
each monitoring device further comprises a countermeasure module operable to prevent the wireless device access to the data network via each of the plurality of wireless access points if the wireless device is not one of the plurality of authorized devices.

39. The system of claim 36, wherein:
the plurality of authorized devices includes a plurality of wireless access points and a plurality of authorized wireless clients, each of the wireless access points operable to provide one or more of the authorized wireless clients access to the data network;
the packet analysis module is further operable to:
determine whether the particular wireless device is a wireless access point or a wireless client based on the analysis of the at least one particular packet; and
determine whether the particular wireless device is one of the plurality of authorized devices by:
determining whether the wireless access point is one of the plurality of authorized wireless access points if the particular wireless device is a wireless access point; and
determining whether the wireless client is one of the plurality of authorized wireless clients if the particular wireless device is a wireless client.

40. The system of claim 36, wherein the packet analysis module is further operable to determine whether the wireless device is one of a plurality of authorized wireless devices by performing at least one of the following:
determining the manufacturer of the wireless device and determining whether the manufacturer of the wireless device matches the manufacturer of at least one of the plurality of authorized wireless devices;
determining whether the wired equivalency privacy (WEP) associated with the wireless device is turned on;
determining whether the MAC address of the wireless device matches the MAC address of any of the plurality of authorized wireless devices;
determining whether the service set identifier (SSID) of the wireless device matches the service set identifier of each of the plurality of authorized wireless devices; and
determining whether the wireless device is broadcasting packets.

41. A method for monitoring a wireless network, comprising:
receiving one or more packets communicated from a wireless device at one of a plurality of monitoring devices operable to manage access to a data network associated with a plurality of authorized devices;
filtering the one or more received packets, at the monitoring device, to identify any packets associated with the establishment of a communication session;
analyzing at least one particular packet identified as being associated with the establishment of a communication session;
determining whether the communication session is valid based on the analysis of the at least one particular packet associated with the establishment of a communication session;

communicating an alert if the communication session is not valid and; and determining whether the particular communication session is a new session or an existing session based on the analysis of the at least one particular packet.

42. The method of claim 41, wherein the plurality of authorized devices includes a plurality of authorized wireless access points and a plurality of authorized wireless clients, each of the wireless access points operable to provide one or more of the authorized wireless clients access to the data network, the method further comprising preventing the wireless device access to the data network via each of the plurality of wireless access points if the wireless device is not one of the plurality of authorized devices.

43. The method of claim 41, further comprising determining whether the wireless device is one of a plurality of authorized wireless devices by performing at least one of the following:

determining the manufacturer of the wireless device and determining whether the manufacturer of the wireless device matches the manufacturer of at least one of the plurality of authorized wireless devices;

determining whether the wired equivalency privacy (WEP) associated with the wireless device is turned on;

determining whether the MAC address of the wireless device matches the MAC address of any of the plurality of authorized wireless devices;

determining whether the service set identifier (SSID) of the wireless device matches the service set identifier of each of the plurality of authorized wireless devices; and determining whether the wireless device is broadcasting packets.

44. A system for monitoring a wireless network, comprising:

a security network including a plurality of monitoring devices coupled to a centralized security manager, the security network operable to manage access to a data network associated with a plurality of authorized devices;

wherein each monitoring device comprises:

a packet sniffing module operable to receive packets communicated from one or more wireless device, each packet associated with a communication session;

a packet filtering module operable to identify one or more packets associated with the establishment of a communication session;

a packet analysis module operable to:

analyze the one or more packets associated with the establishment of a communication session; and determine whether a particular communication session is valid based on the analysis of at least one particular packet associated with the establishment of a communication session;

an alert module operable to communicate an alert if the particular communication session is not valid, wherein the plurality of authorized devices includes a plurality of wireless access points and a plurality of authorized wireless clients, each of the wireless access points operable to provide one or more of the authorized wireless clients access to the data network;

the packet analysis module is further operable to:

determine whether the particular wireless device is a wireless access point or a wireless client based on the analysis of the at least one particular packet; and determine whether the particular wireless device is one of the plurality of authorized devices by:

determining whether the wireless access point is one of the plurality of authorized wireless access points if the particular wireless device is a wireless access point; and determining whether the wireless client is one of the plurality of authorized wireless clients if the particular wireless device is a wireless client.

45. A method for monitoring a wireless network, comprising:

receiving one or more packets communicated from a wireless device at one of a plurality of monitoring devices operable to manage access to a data network associated with a plurality of authorized devices;

filtering the one or more received packets, at the monitoring device, to identify any packets associated with the establishment of a communication session;

analyzing at least one particular packet identified as being associated with the establishment of a communication session;

determining whether the communication session is valid based on the analysis of the at least one particular packet associated with the establishment of a communication session; and communicating an alert if the communication session is not valid, wherein the plurality of authorized devices includes a plurality of authorized wireless access points and a plurality of authorized wireless clients, each of the wireless access points operable to provide one or more of the authorized wireless clients access to the data network, the method further comprising preventing the wireless device access to the data network via each of the plurality of wireless access points if the wireless device is not one of the plurality of authorized devices.

* * * * *